Patented Dec. 13, 1938

2,140,265

UNITED STATES PATENT OFFICE 2,140,265

PROCESS OF MANUFACTURING AN ELASTIC, POROUS, AND COMPRESSIBLE PRODUCT

Martin Leatherman, Hyattsville, Md., dedicated to the free use of the Public in the territory of the United States of America No Drawing. Application January 5, 1937, Serial No. 119,099

1 Claim. (Cl. 106—23)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

I hereby dedicate the invention herein described to the free use of the public in the territory of the United States of America to take effect upon the granting of a patent to me.

This invention relates to a composition of matter useful for filling and waterproofing the spaces left in masonry and other construction to provide for expansion and contraction caused by changes of temperature.

The materials commonly used for filling expansion joint voids lack compressibility and consequently are extruded in warm weather. In some cases, as for example, asphalt fillers, flowing also occurs when the joint is not horizontal and such fillers are not suited for use under such conditions. In any case, the material which is extruded does not return to position when contraction again leaves a void at the joint. This is especially undesirable on highways where the extruded material causes humps at the joints and results in excessive wear and tear of the road surface at the humps on the sides away from approaching traffic.

The use of rubber in combination with various fillers and coagulants has been advocated, but rubber is not sufficiently compressible and is likewise extruded to an undesirable extent.

The ideal expansion joint filler must possess the following characteristics:

It must adhere tightly to the masonry or other face at each side of the joint; it must be compressible enough to avoid being extruded during the warmest weather when the distance between the two masonry or other faces is the smallest; it must be elastic so that it will return to position when the distance at the joint is at a maximum and thus exclude water during freezing weather; it must be easily applied, and it must have a long serviceable life. It is desirable that the materials used in the filler be cheap.

I am aware that the use of rubber-rosin mixtures has been advocated for filling expansion joints, but nothing heretofore developed has been successful because one or more of the requirements set forth above were not met by such mixtures.

By carrying on a practical study of the interaction of rubber latex and powdered rosin, I have discovered that the addition of certain ingredients yields a final product which meets the requirements set forth above.

As is well known, rosin is composed chiefly of abietic acid. Furthermore, rubber is commonly preserved and kept dispersed in the form of latex by the presence of ammonia. The addition of rosin to rubber latex causes speedy coagulation of the rubber, partly because of neutralization of the ammonia by the abietic acid. Ammonium abietate or resinate is a soap and forms soap bubbles which remain as pores throughout the coagulated rubber.

In reality, ammonium resinate is partly a colloidal dispersion of rosin in aqueous ammonia, and solutions of ammonium resinate are sirupy in nature. The pores of the coagulated rubber formed by the ammonium resinate soap bubbles become filled with the sirupy liquid, which shows no tendency to leave the pores or to decompose because the pores are not inter-connecting, and because there is no circulation of air to carry off the ammonia. The sirupy consistency prevents flow of the fluid in the coagulated rubber and the stability of the rosin-ammonia-water liquid mixture prevents drying out of the rosin-rubber filler. The sirupy liquid prevents formation of a good bond with the masonry or other surfaces.

I have discovered that the addition of a difficultly soluble salt of a metal whose resinate is water insoluble gradually causes a complete break-up of the rosin-ammonia-water system, apparently because of the inter-action of ammonium resinate and the difficultly soluble salt. The salt must be difficultly soluble, as otherwise the latex is too rapidly coagulated.

I have further discovered that the flexibility and elasticity of the rubber-rosin composition is increased by the presence of hydrophilic colloids such as bentonite. I do not know the reason for this. However, the water absorbing capacity of such materials assists in drying out the composition.

The advantages of my composition can be stated as follows: It can be prepared very simply by grinding all of the dry ingredients together to a sufficient degree of fineness and stirring the dry powdered mixture into the latex, which has been adjusted to the most desirable water content and fortified with sufficient ammonia. The consistency of the final product can be varied at will by adding more or less of the dry mixture. There is nothing in the dry mixture to prevent the soap formation between the ammonia and rosin of the composition. This soap formation is a valuable feature of my invention since it gives rise to the pores which are present throughout the final coagulated product. These pores are not inter-connecting and do not affect the waterproofness of the final product, but they do greatly increase the compressibility of the product.

The hydrophilic colloid stabilizes the bubbles formed by the ammonium resinate soap, and also plays a very important part in imparting a rubber-like nature to the final coagulated product. Without the hydrophilic colloid, the product pulls apart easily and has very little elasticity or compressibility.

The difficulty soluble salt also plays a very important and necessary part in my mixture. If the salt is too soluble it reacts too rapidly with the ammonium resinate and destroys the rubberiness of my product. Because of a too rapid reaction, there is a too speedy coagulation or setting of the final mixture. It is desirable for most purposes that there be an interval of perhaps several hours before setting occurs after the dry mixture is stirred into the latex. By suitably varying the solubility of the salt used, the setting time can be controlled. However, the setting time is also affected by the concentration of the ammonia in the latex. Thus by varying the nature and amounts of the ingredients which I use, I can modify the setting time and the physical properties of my mixture at will. Also by varying the proportion of dry component to liquid component, I can obtain a free flowing mixture which pours readily into highway expansion joints or a paste which is suitable for use as a caulking compound.

As one example of my composition, I may take as the liquid component 30 kilograms of 75 per cent rubber latex, diluted with 15 liters of water and 5 liters of 28 per cent aqueous ammonia. Into this liquid mixture I stir a finely powdered mixture of 8 kilograms of rosin, 2 kilograms of bentonite, and 5 kilograms of blanc fixe. For some purposes I may wish to increase or decrease the proportion of dry component while maintaining the same ratio of the constituents of the dry component, and in some cases I may desire to alter the amounts of one or more constituents, for example, I may take only 4 liters of aqueous ammonia.

As another example of my composition, I may take as the liquid component 30 kilograms of 75 per cent rubber latex, diluted with 15 liters of water and 5 liters of 28 per cent aqueous ammonia, and add thereto a powdered mixture of 9.5 kilograms of rosin, 2.35 kilograms of bentonite, and 3.25 kilograms of gypsum.

As still another example of my composition, I may take as the liquid component 30 kilograms of 75 per cent rubber latex diluted with 15 liters of water and 5 liters of 28 per cent aqueous ammonia, to which I add a powdered dry mixture of 9.6 kilograms of rosin, 2.4 kilograms of bentonite, and 3 kilograms of aluminum orthophosphate.

It is understood that these proportions are not rigid, and that the proportions may be varied in order to adapt the final product to any special requirements.

It is well known that rosin undergoes spontaneous oxidation when in contact with atmospheric oxygen. This oxidation is greatly retarded when the rosin is protected by a material which is largely impervious to air. Rubber is such a material; therefore the interior of my composition retains its elasticity and other desirable properties over a considerable period of time. However, when the product is used on highways, it may be desirable to protect the surface from sand and other abrasive materials. This may be done by putting a protective coating of tar or asphaltic material over the top of the coagulated product.

It will be quite feasible to include pigments with my composition in cases where joints or other cavities in colored masonry are to be filled, and it is desirable to harbonize the filler composition with the color of the surrounding structure. In case pigments are used, they can be conveniently incorporated into the dry mixture before it is mixed into the rubber latex.

Having made a full disclosure of my invention, I claim:

The process of manufacturing an elastic, porous and compressible product, which comprises incorporating into an ammoniacal rubber latex a dry powdered mixture of rosin, bentonite and a difficultly water-soluble salt of a metal the resinate of which is water-insoluble.

MARTIN LEATHERMAN.